C. C. FARMER.
FLUID PRESSURE REGULATOR.
APPLICATION FILED OCT. 25, 1906.
920,447.
Patented May 4, 1909.
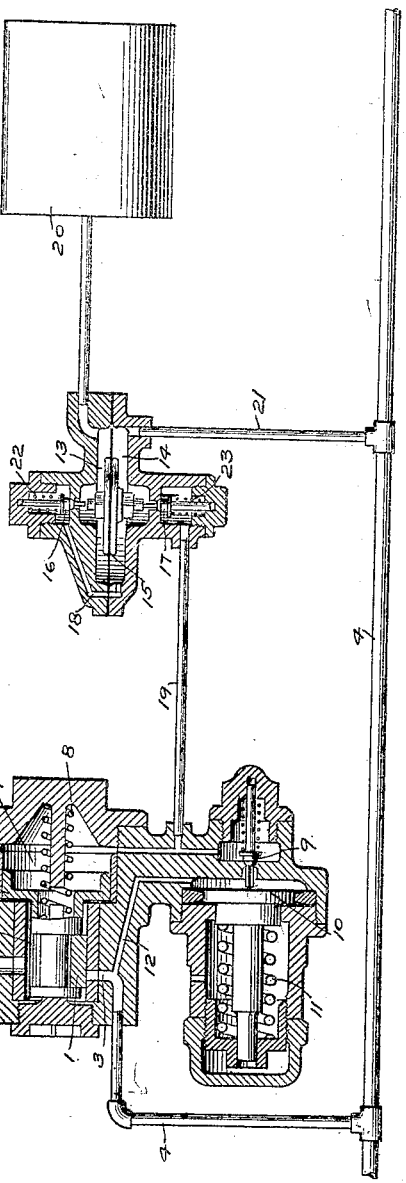

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE REGULATOR.

No. 920,447.　　　　Specification of Letters Patent.　　　　Patented May 4, 1909.

Application filed October 25, 1906. Serial No. 340,503.

*To all whom it may concern:*

Be it known that I, CLYDE C. FARMER, a citizen of the United States, residing at Chicago, in the county of Cook and State of Illinois, have invented new and useful Improvements in Fluid-Pressure Regulators, of which the following is a specification.

This invention relates to fluid pressure regulators, or pressure reducing valve devices which are employed for controlling the flow of fluid under pressure from a source of high pressure to a pipe, chamber, or other space in which the fluid is to be maintained at certain lower degree of pressure. These valve devices are usually governed by the pressure upon the outlet or low pressure side of the valve and are adapted to open when such pressure falls below a predetermined point and to close when such pressure rises to a predetermined maximum. One difficulty heretofore experienced with valve mechanisms of this type has been that, after the low pressure chamber is fully charged to the desired degree and the valve closed, it requires a considerable drop in the pressure of said chamber to cause the valve to open, and another objection is that, when the low pressure chamber has been recharged nearly to the desired degree, the valve device partially closes and greatly restricts the feed opening, so that the rise in pressure in the outlet chamber for the last few pounds to the desired degree of pressure at which the valve closes is very slow.

The principal object of my present invention is to provide an improved controlling device for such valve mechanism, whereby only a slight reduction in pressure in the outlet chamber below the desired degree is sufficient to cause a prompt opening of the valve, and also adapted to maintain the feed port substantially full open when recharging the low pressure chamber, until the pressure therein reaches nearly or quite the desired degree at which the valve is adjusted to close, thereby rendering the mechanism much more sensitive and accurate in its operation.

My improvement is particularly adapted for use in controlling compressed air, and may be employed to advantage as a feed valve device in air brake systems, although the invention is in no way limited to such use, but may be applied in other arts and for the control of various other fluids.

In the accompanying drawing the figure illustrates in sectional view one form of apparatus embodying my invention.

As shown in the drawing, the main valve 1 controls the supply of fluid under pressure from the source of high pressure, or pipe 2, through the feed port 3, to the outlet chamber or pipe 4, in which it is desired to maintain the pressure at a predetermined degree, the valve 1 being operated by a piston 5 subject on one side to the high pressure as admitted to the valve chamber 6 and on the other side to pressure in chamber 7, and a spring 8 which normally holds the valve in its closed position.

It has heretofore been proposed to control the pressure acting on one side of the piston in chamber 7 by means of a small regulating valve 9 operated by a diaphragm 10, which is subject to the pressure of the outlet chamber on one side through port 12, and in the opposite direction to the force of an adjustable spring 11, which is set to the desired tension or pressure that it is desired to maintain in the outlet chamber, and this part of the device is also illustrated in the drawing as one means for ultimately determining the maximum degree of pressure, although it may in some cases be dispensed with, as hereinafter described.

According to the preferred form of my improvement, the pressure on one side of the main piston is governed by a controlling device comprising a casing containing a diaphragm 15, two chambers 13 and 14, and a regulating valve 17, the chamber of which is connected by a passage or pipe 19 with the piston chamber 7, so that the regulating valve 17 acts to control the release of fluid from the piston chamber to the chamber 14 beneath the diaphragm 15, which chamber also communicates with the low pressure chamber or pipe 4 through a pipe connection 21, preferably some distance from the inlet port 3.

Any suitable means may be employed for maintaining a constant pressure in the chamber 13 and communicating reservoir 20, but as herein shown such means comprise the regulating valve 9, diaphragm 10 and spring 11, which operate to limit the pressure admitted to the pipe 4 to a predetermined degree, and the by-pass 18 leading from chamber 14 to the chamber 13 and containing the valve 16 adapted to normally be held closed by the spring 22, but is opened by the diaphragm 15 when the pressure in the pipe 4 and chamber 14 rises above that of the reservoir 20.

When the spring 11 is adjusted for the desired degree of outlet pressure and fluid is supplied from high pressure pipe 2 to the valve chamber 6, the pressure therein carries the piston 5 outward, compressing spring 8 and moving main valve 1 to open feed port 3 and supply fluid to the outlet chamber or pipe 4. As the pressure in this pipe, and consequently in chamber 14, increases, the diaphragm 15 rises and opens by-pass valve 16, thereby feeding fluid through port 18 to the maintaining chamber 13 and reservoir 20. When the pressure in the outlet chamber has finally reached the degree for which the spring 11 is adjusted, the regulating valve 9 will be closed, and as the fluid pressures upon opposite sides of piston 5 substantially equalize the spring 8 moves the valve 1 to close the feed port. As the reservoir 20 is then charged up to the same desired degree of pressure which is equal on opposite sides of diaphragm 15, this occupies a middle position with both valves 16 and 17 closed. The spring 22 is adapted to hold the small valve 16 tightly closed against any reduction of pressure in the outlet chamber, so that the pressure in chamber 13 will be sealed and maintained constant at whatever degree the chamber and reservoir are charged.

The diaphragm 15 is preferably of sufficiently large area that a very slight difference in pressure, say one pound or less, upon its opposite sides, will cause it to deflect and fully open either of the small valves 16 or 17. Therefore, when a very slight reduction is made in the outlet chamber or pipe 4, even if such reduction is insufficient to affect the diaphragm 10, still the diaphragm 15 promptly moves downward and fully opens small regulating valve 17, thereby releasing fluid from the chamber 7 of piston 5 to the outlet chamber, whereupon the main valve 1 is instantly opened and fluid is supplied to the outlet pipe 4 to restore the desired pressure therein. As soon as the pressure is restored in said pipe 4 and chamber 14 to substantially equal the sealed pressure in chamber 3, the diaphragm 15 rises to its normal intermediate position, allowing the regulating valve 17 to be closed by the spring 23, whereupon the fluid pressure again equalizes upon piston 5 and the main valve is closed.

If a considerable reduction has been made in the outlet pipe, as is sometimes the case in the operation of an air brake system, and the feed valve device is opened to restore the pressure therein, it will be seen that by means of the sensitive diaphragm 15 the regulating valve 17 will be held fully open until the restored pressure has increased to within a fraction of a pound of the constant pressure sealed up in the maintaining chamber, consequently the main valve will maintain its full open position for practically the entire time of recharging, even though the regulating valve 9 does assume a nearly closed position during the period of restoring the last few pounds of pressure in the system.

It will now be evident that by means of my improvement a very sensitive regulating apparatus is produced which accurately controls the fluid pressure, responds promptly to very slight reductions in pressure, and operates to rapidly restore the full pressure in the outlet chamber after a reduction has been made.

When any other means than that shown is employed for maintaining the desired degree of fluid pressure constant in the reservoir 20, it will be obvious that the regulating mechanism comprising spring 11, diaphragm 10 and valve 9, also by-pass 18 and valve 16, may be dispensed with, as the apparatus will then operate satisfactorily without these parts.

Having now described my invention, what I claim as new and desire to secure by Letters Patent, is:—

1. A fluid pressure regulator comprising a main valve, a piston for operating same, a regulating valve for governing the pressure on one side of said piston, a diaphragm subject to the opposing fluid pressure of the outlet chamber and a maintaining chamber for operating said regulating valve, and means for charging said maintaining chamber to the desired degree of pressure.

2. A fluid pressure regulator comprising a main valve, a piston for operating same, a regulating valve for governing the pressure on one side of said piston, a diaphragm subject to the opposing fluid pressures of the outlet chamber and a maintaining chamber for operating said regulating valve, and a regulating mechanism governed by fluid pressure and an opposing adjustable spring for limiting the fluid pressure admitted to said maintaining chamber to the desired degree.

3. A fluid pressure regulator comprising a main valve, a piston for operating same, a regulating valve for governing the pressure on one side of said piston, a diaphragm subject to the opposing fluid pressures of the outlet chamber and a maintaining chamber for operating said regulating valve, and a second regulating valve governed by the opposing pressures of the outlet pressure and a spring for limiting the pressure admitted to said maintaining chamber.

4. A fluid pressure regulator comprising a main valve, a piston for operating same, a regulating valve for governing the pressure on one side of said piston, a diaphragm subject to the opposing fluid pressures of the outlet chamber and a maintaining chamber for operating said regulating valve, and a second regulating valve governed by the opposing pressures of the outlet pressure and a spring for also controlling the pressure on one side of said piston, and means for supplying fluid from the outlet chamber to said reservoir.

5. A fluid pressure regulator comprising a main valve and a piston for operating same, a regulating valve for governing the pressure on one side of said piston, a diaphragm subject to the opposing pressures of the outlet chamber and a maintaining chamber for operating said regulating valve, a second regulating valve governed by the outlet pressure for also controlling the pressure on one side of said piston, and a by-pass valve operated by said diaphragm for supplying fluid from the outlet chamber to the maintaining reservoir.

6. A fluid pressure regulator comprising a main valve, a piston for operating same, a regulating valve for governing the pressure on one side of said piston, a diaphragm subject to the opposing fluid pressures of the outlet chamber and a maintaining chamber for operating said regulating valve, and means for supplying air from the outlet chamber to said maintaining chamber.

7. A fluid pressure regulator comprising a main valve, a piston for operating same, a regulating valve for governing the pressure on one side of said piston, a diaphragm subject to the opposing fluid pressures of the outlet chamber and a maintaining chamber for operating said regulating valve, and means for automatically charging said maintaining chamber to the desired degree of pressure.

In testimony whereof I have hereunto set my hand.

CLYDE C. FARMER.

Witnesses:
R. F. EMERY,
J. B. MacDONALD.